United States Patent
Ryu et al.

(10) Patent No.: US 10,646,086 B2
(45) Date of Patent: May 12, 2020

(54) CLEANING ROBOT AND METHOD OF CONTROLLING THE SAME

(71) Applicant: Samsung Electronics Co., Ltd., Gyeonggi-do (KR)

(72) Inventors: Min Woo Ryu, Suwon-si (KR); Dong Hun Lee, Ansan-si (KR); Jae Yoon Jeong, Pyeongtaek-si (KR); Young Do Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 15/782,783

(22) Filed: Oct. 12, 2017

(65) Prior Publication Data

US 2018/0098676 A1    Apr. 12, 2018

(30) Foreign Application Priority Data

Oct. 12, 2016  (KR) .................. 10-2016-0131802

(51) Int. Cl.
*A47L 9/28* (2006.01)
*G05D 1/02* (2020.01)
(Continued)

(52) U.S. Cl.
CPC .......... *A47L 9/2805* (2013.01); *A47L 9/2857* (2013.01); *A47L 9/2894* (2013.01); *G05D 1/028* (2013.01);
(Continued)

(58) Field of Classification Search
CPC .... A47L 2201/02; A47L 2201/04; A47L 5/30; A47L 9/2805; A47L 9/2857;
(Continued)

(56) References Cited

U.S. PATENT DOCUMENTS

2006/0087273 A1* 4/2006 Ko .................. A47L 9/009
                                        318/568.12
2008/0004751 A1* 1/2008 Chung .............. G05D 1/0225
                                        700/258
(Continued)

FOREIGN PATENT DOCUMENTS

EP      1717660 A2   11/2006
JP    2015027539 A    2/2015
(Continued)

OTHER PUBLICATIONS

Communication from a foreign patent office in a counterpart foreign application, European Patent Office, "European Search Report," European Application No. 17194820.1, dated Mar. 13, 2018, 8 pages.
(Continued)

*Primary Examiner* — Harry Y Oh

(57) ABSTRACT

Embodiments of the present disclosure relate to a cleaning robot and a method of controlling the same, and more particularly, to a cleaning robot docking to a station based on a radio frequency (RF) signal and a method of controlling the same.

An aspect of the present disclosure, there is provided a cleaning robot comprising a cleaning robot antenna unit configured to receive a radio frequency (RF) signal transmitted from a station; and a controller configured to extract a received signal strength indicator (RSSI) value by processing the RF signal received by the cleaning robot antenna unit and control movement of the cleaning robot to dock to the station based on the extracted RSSI value.

18 Claims, 16 Drawing Sheets

(51) Int. Cl.
  *H04B 17/318* (2015.01)
  *A47L 5/30* (2006.01)
(52) U.S. Cl.
  CPC ......... *G05D 1/0225* (2013.01); *H04B 17/318* (2015.01); *A47L 5/30* (2013.01); *A47L 2201/02* (2013.01); *A47L 2201/04* (2013.01); *G05D 2201/0215* (2013.01)
(58) Field of Classification Search
  CPC .... A47L 9/2894; G05D 1/0225; G05D 1/028; G05D 2201/0215; H04B 17/318
  See application file for complete search history.

(56) References Cited

U.S. PATENT DOCUMENTS

| | | | |
|---|---|---|---|
| 2011/0004339 A1 | 1/2011 | Ozick et al. | |
| 2013/0073088 A1 | 3/2013 | Lee et al. | |
| 2016/0166126 A1* | 6/2016 | Morin | A47L 9/2815/319 |
| 2017/0131721 A1* | 5/2017 | Kwak | B25J 9/1664 |
| 2017/0215670 A1* | 8/2017 | Heo | G01J 1/00 |

FOREIGN PATENT DOCUMENTS

| | | |
|---|---|---|
| KR | 100575706 B1 | 4/2006 |
| KR | 101366860 B1 | 2/2014 |
| KR | 20160008856 A | 1/2016 |

OTHER PUBLICATIONS

Deyle, Travis, et al., "Finding and Navigating to Household Objects with UHF RFID Tags by Optimizing RF Signal Strength," 2014 IEEE/RJS International Conference on Intelligent Robots and Systems (IROS 2014), Chicago, IL, USA, Sep. 14-18, 2014, 9 pages.

Kim, Myungsik, et al., "RFID-based mobile robot guidance to a stationary target," Mechatronics 17 (2007) 217-229, Received Mar. 28, 2006, Accepted Jan. 17, 2007, 13 pages.

Kim, Myungsik, et al., "Direction Sensing RFID Reader for Mobile Robot Navigation," IEEE Transactions on Automation Science and Engineering, vol. 6, No. 1, Jan. 2009, 11 pages.

* cited by examiner

CLEANING ROBOT AND METHOD OF CONTROLLING THE SAME

CROSS-REFERENCE TO RELATED APPLICATION AND CLAIM OF PRIORITY

This application claims the benefit of Korean Patent Application No. 10-2016-0131802, filed on Oct. 12, 2016, in the Korean Intellectual Property Office, the disclosure of which is incorporated herein by reference.

TECHNICAL FIELD

Embodiments of the present disclosure relate to a cleaning robot and a method of controlling the same, and more particularly, to a cleaning robot docking to a station based on a radio frequency (RF) signal and a method of controlling the same.

BACKGROUND

A cleaning robot is an autonomous cleaning apparatus that sucks foreign substances such as dusts from the floor while traveling an area to be cleaned without user's control.

The cleaning robot needs to search for a station for recharging and dock to the station to recharge. If the cleaning robot fails to recognize an accurate position of the station, the operation of the cleaning robot may stop due to decreased battery power caused by the failure in finding the station. Thus, research has been conducted on docking methods of cleaning robots to stations by accurately find positions of the stations.

Currently, IR sensor-based docking methods, LIDAR pattern recognition-based docking methods, and image sensor-based docking methods have been widely applied to cleaning robots as docking methods. However, if a cleaning robot located at a remote position from a station cannot recognize a guide signal of the station, the cleaning robot may perform normal docking to the station.

SUMMARY

Therefore, it is an aspect of the present disclosure to provide a cleaning robot that recognizes an RF signal generated by a station and a method of controlling the same.

Additional aspects of the disclosure will be set forth in part in the description which follows and, in part, will be obvious from the description, or may be learned by practice of the disclosure.

An aspect of the present disclosure there is provided a cleaning robot comprising a cleaning robot antenna unit configured to receive a radio frequency (RF) signal transmitted from a station; and a controller configured to extract a received signal strength indicator (RSSI) value by processing the RF signal received by the cleaning robot antenna unit and control movement of the cleaning robot to dock to the station based on the extracted RSSI value.

The controller may estimate a direction of the station based on the extracted RSSI value and controls movement of the cleaning robot in the estimated direction.

The cleaning robot antenna unit may comprise a directional antenna configured to measure intensities of RF signals as different levels on the basis of direction or receiving the RF signal.

The cleaning robot may comprise a memory in which map data comprising information on intensity and direction of the RSSI value for an area to be cleaned is stored, wherein the controller estimates the direction of the station based on map data if map data for a current position of the cleaning robot is stored in the memory, and estimates the direction of the station based on the extracted RSSI value if map data for the current position of the cleaning robot is not stored in the memory.

The cleaning robot may further comprise a rotatably provided support plate, wherein the cleaning robot antenna unit is fixed to the support plate and rotates together with the support plate, and the controller extracts RSSI values with respect to rotation angles of the support plate and controls movement of the cleaning robot in a direction where a highest RSSI value is extracted based on the extracted RSSI values.

The cleaning robot antenna unit may comprise a plurality of antennas, and the controller may extract RSSI values by processing RF signals received by the plurality of antennas, extract a new RSSI value by integrating the extracted RSSI values, and control movement of the cleaning robot to dock to the station based on the extracted new RSSI value.

The controller may sequentially control On/Off states of the plurality of antennas.

The controller may control the cleaning robot to turn in place, extract RSSI values with respect to rotation angles of the cleaning robot, and control movement of the cleaning robot in a direction where a highest RSSI value is extracted based on the extracted RSSI values.

The station may comprise a station antenna unit configured to transmit an RF signal; and a station controller configured to generate the RF signal transmitted from the station antenna unit.

The station antenna unit may comprise a plurality of antennas.

The station controller may control the station antenna unit to transmit a weaker RF signal as a distance between the cleaning robot and the station decreases.

Another aspect of the present disclosure, there is provided a method of controlling a cleaning robot. The method may comprise receiving an RF signal transmitted from a station, the receiving being performed by a cleaning robot antenna unit; extracting a received signal strength indicator (RSSI) value by processing the received RF signal; and moving the cleaning robot to dock to the station based on the extracted RSSI value.

The moving of the cleaning robot to dock to the station based on the extracted RSSI value may comprise estimating a direction of the station based on the extracted RSSI value and moving the cleaning robot in the estimated direction.

The cleaning robot may further comprise a memory in which map data comprising information on intensity and direction of the RSSI value for an area to be cleaned is stored, and the moving of the cleaning robot to dock to the station based on the extracted RSSI value may comprise estimating the direction of the station based on map data if map data for a current position of the cleaning robot is stored in the memory; and estimating the direction of the station based on the extracted RSSI value if map data for the current position of the cleaning robot is not stored in the memory.

The cleaning robot may comprise a rotatably provided support plate to which the cleaning robot antenna unit is fixed, and the receiving of the RF signal transmitted from the station may comprise a process in which the cleaning robot antenna unit receives the RF signal transmitted from the station while rotating together with the support plate at the time.

The extracting of the RSSI value by processing the received RF signal may comprise extracting an RSSI value with respect to a rotation angle of the support plate by processing the received RF signal.

The moving of the cleaning robot to dock to the station based on the extracted RSSI value may comprise moving the cleaning robot in a direction where a highest RSSI value is extracted based on the extracted RSSI value.

The cleaning robot antenna unit may comprise a plurality of antennas, and the extracting of the RSSI value by processing the received RF signal and the moving of the cleaning robot to dock to the station based on the extracted RSSI may comprise extracting RSSI values by processing RF signals received by the plurality of antennas, extracting a new RSSI value by integrating the extracted RSSI values, and moving the cleaning robot to dock to the station based on the extracted new RSSI value.

The receiving of the RF signal transmitted from the station may comprise receiving an RF signal transmitted from the station via the cleaning robot antenna unit while the cleaning robot turns in place, and the moving of the cleaning robot to dock to the station based on the extracted RSSI value may comprise estimating a direction where a highest RSSI value is extracted as a direction of the station based on the extracted RSSI value; and moving the cleaning robot in the estimated direction.

When an obstacle is detected in a moving path of the cleaning robot, the cleaning robot may move in a direction where a second highest RSSI value is extracted at a position where the obstacle is detected.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
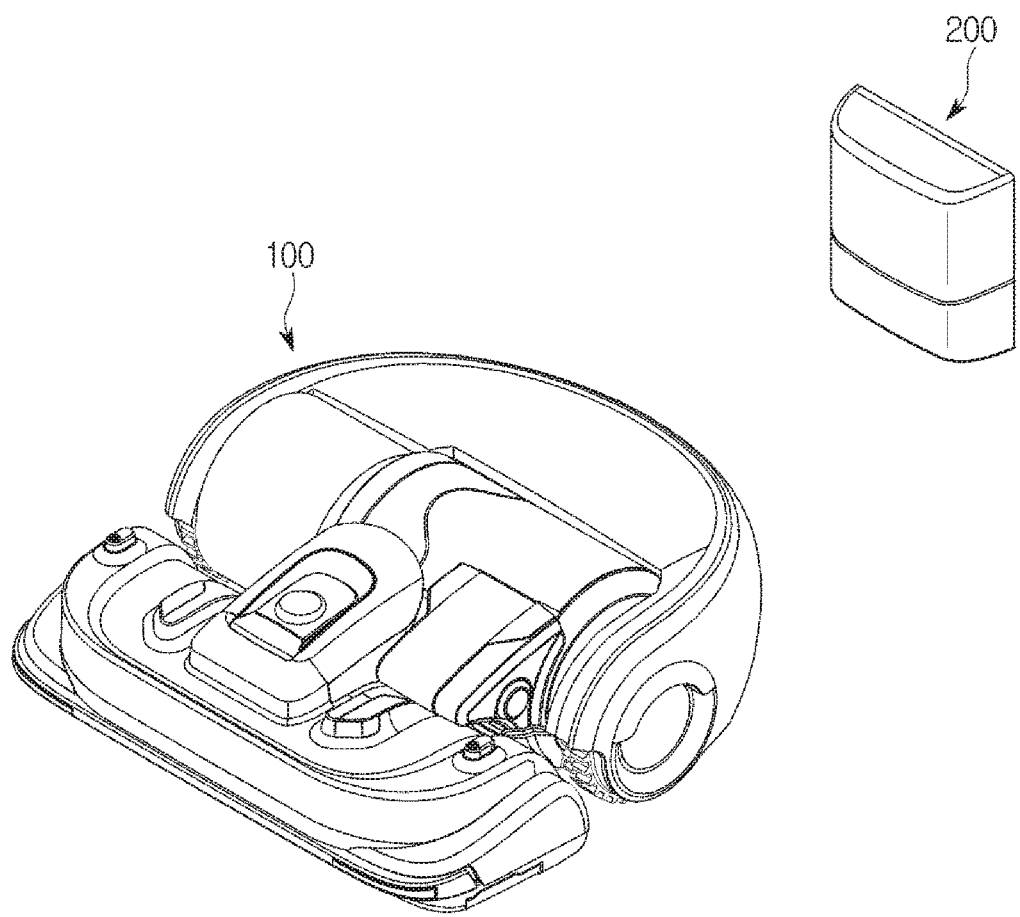
FIG. 1 is a view illustrating a cleaning robot docking system according to an embodiment.

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted.

The terms 'unit', 'module', or 'block' used in the specification may be implemented using a software or hardware component. According to an embodiment, a plurality of 'units', 'modules', or 'blocks' may also be implemented using an element and one 'unit', 'module', or 'block' may include a plurality of elements.

Throughout the specification, when an element is referred to as being "connected to" another element, it may be directly or indirectly connected to the other element and the "indirectly connected to" includes connected to the other element via a wireless communication network.

Also, it is to be understood that the terms "include" or "have" are intended to indicate the existence of elements disclosed in the specification, and are not intended to preclude the possibility that one or more other elements may exist or may be added.

In this specification, terms "first," "second," etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, operating principles and embodiments of the present disclosure will be described with reference to the accompanying drawings.

FIG. 1 is a view illustrating a cleaning robot docking system according to an embodiment.

Referring to FIG. 1, a cleaning robot docking system according to an embodiment includes a cleaning robot 100 and a station 200.

The cleaning robot 100 receives a radio frequency (RF) signal from the station 200 and processes the received signal to dock to the station 200.

The station 200 guides the cleaning robot 100 to dock to the station 200 by transmitting the RF signal.

According to the present embodiment, the cleaning robot 100 may easily find a position of the station 200 by using characteristics of the RF signal even when an obstacle is located between the cleaning robot 100 and the station 200. Also, even when the cleaning robot 100 is located at a remote position from the station 200, the cleaning robot 100 may estimate the position of the station 200 in comparison with conventional methods.

Meanwhile, the cleaning robot docking system based on RF signals may be provided with an additional guide sensor to guide the cleaning robot 100 to be accurately aligned in the station 200 simultaneously avoiding an obstacle O. For example, docking sensors for robots moving in a short distance such as an infrared (IR) sensor, an image sensor, a LiDAR sensor, or the like may be used. Theses sensors may be used as elements of an obstacle sensing unit which will be described below and examples of applicable sensors are not limited thereto.

Before describing the embodiments, properties of RF signals will be described in more detail hereinafter.

Figure 2:
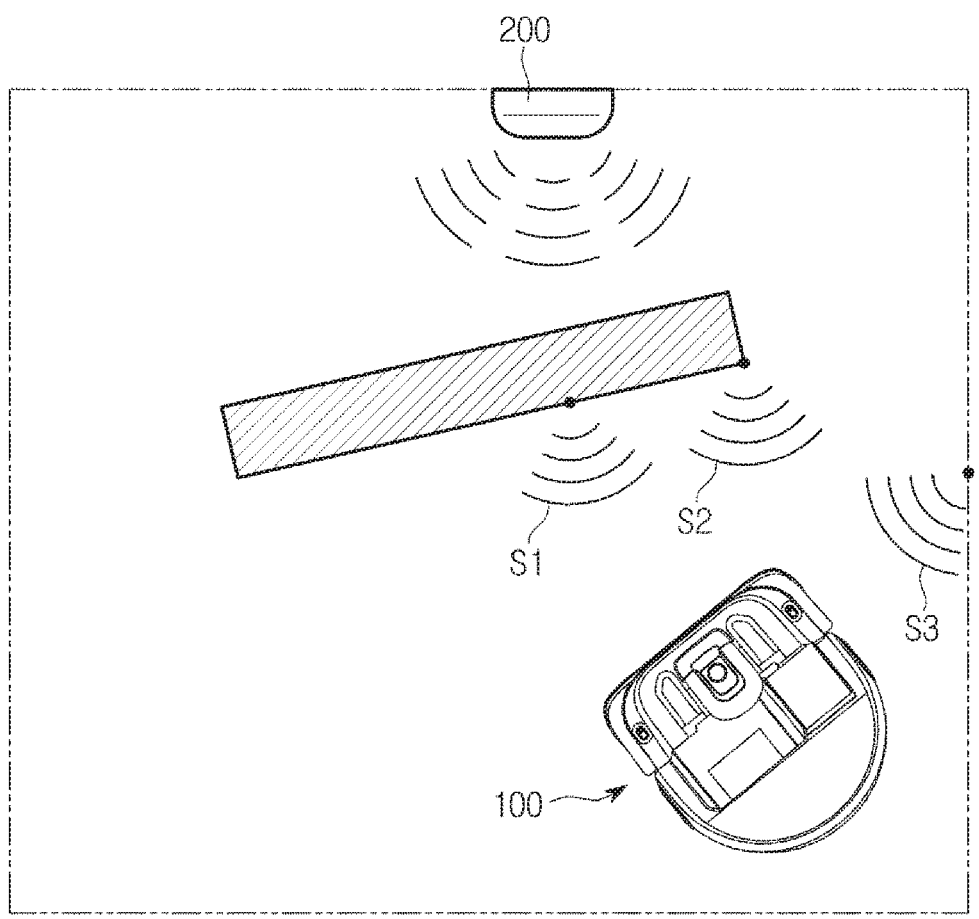
FIG. 2 is a view illustrating properties of RF signals.

FIG. 2 is a view illustrating properties of RF signals.

Referring to FIG. 2, an RF signal may have properties of penetration, diffraction, and reflection.

Penetration refers to a property of the RF signal passing through an object. Even when an obstacle O is located between the cleaning robot 100 and the station 200, the RF signal may be detected behind the obstacle O due to the penetrating property of the RF signal. S1 of FIG. 2 indicates transmitted waves of the RF signal.

Diffraction is a property of the RF signal refracted in a direction different from a proceeding direction of the RF signal at an edge of the obstacle O. Due to diffraction of the RF signal, the RF signal may be detected behind the obstacle O and may also be detected behind a highly conductive material such as metal or liquid through which the RF signal cannot pass. S2 of FIG. 2 indicates diffracted waves of the RF signal.

Reflection is a property of the RF signal reflected by a surface of an object. Due to reflection of the RF signal, the RF signal may be detected at signal shadow areas such as areas behind the obstacle O with respect to the station 200. S3 indicates reflected waves of the RF signal.

The RF signal may include communication signals utilizing industrial, scientific, and medical (ISM) radio bands such as Bluetooth, Wi-Fi, Bluetooth low energy (BLE), Zigbee, ultra wideband (UWB). However, examples of the RF signal are not limited thereto.

Since the cleaning robot docking system according to the present embodiment utilizes the frequency of the ISM radio bands, it may be affected by interference signals in surrounding environments. Thus, a switching technique into a frequency band with less interference may be used by frequency hopping, frequency scanning, or the like. A finger print method or a position correction method using a plurality of antennas may also be used in order to improve accuracy while the cleaning robot 100 is docking.

Meanwhile, since the cleaning robot docking system according to the present embodiment uses RF signals as docking guide signals for the cleaning robot 100, user experience (UX) may be provided using a user device via RF communications. Also, conventional remote control sensors may be replaced with an RF receiver according to the present embodiment and the cleaning robot docking system may be interconnected to a smart device via communication protocols such as BLE, Bluetooth, and WiFi and may also interwork with the Internet of Things (IoT) devices in the future.

Hereinafter, a cleaning robot docking system illustrated in FIG. 1 will be described in more detail. After describing the cleaning robot 100, the station 200 will be described.

First, the configuration and operational principle of the cleaning robot 100 will be described.

Figure 3:
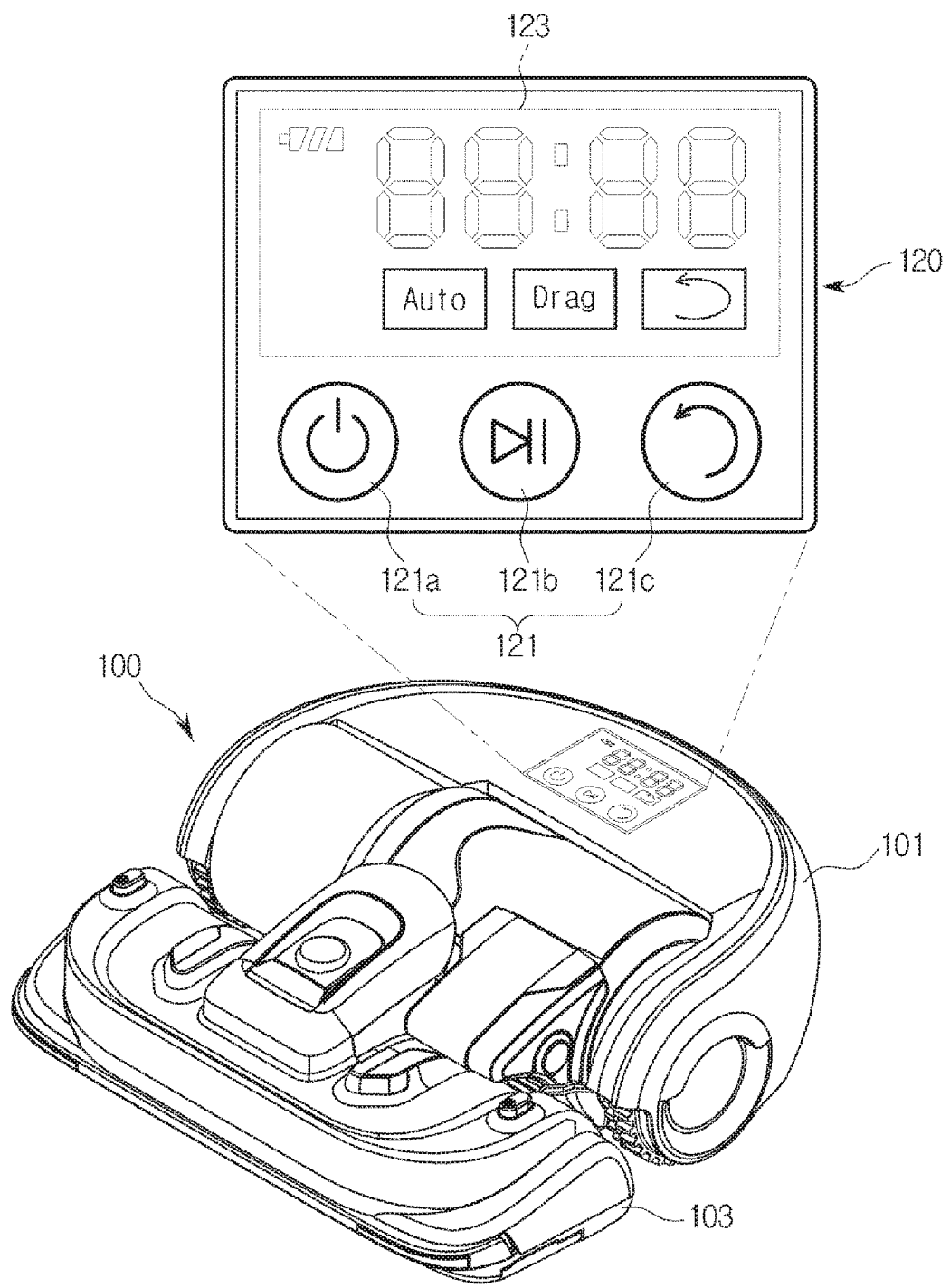
FIG. 3 is a view illustrating an outer appearance of a cleaning robot according to an embodiment.
Figure 4:
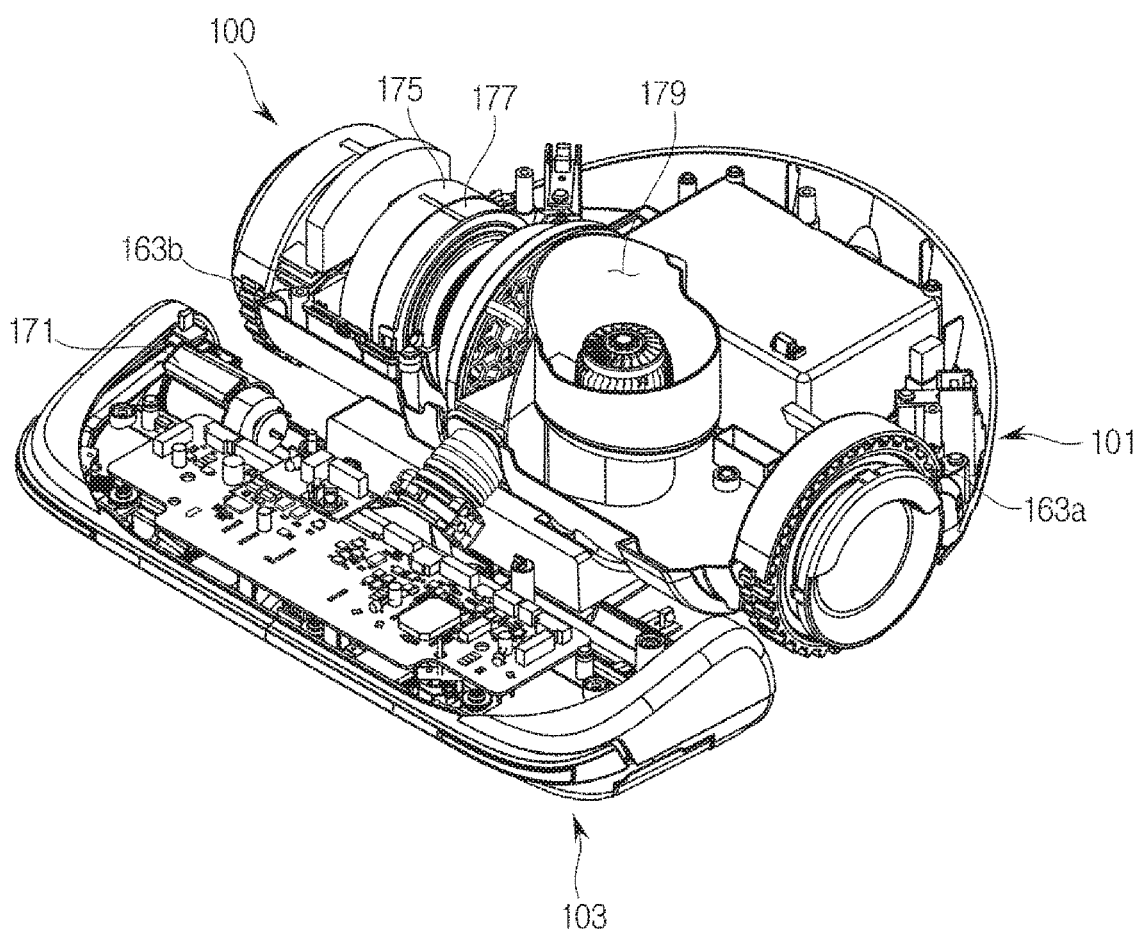
FIG. 4 is a view illustrating the inside of the cleaning robot.
Figure 5:
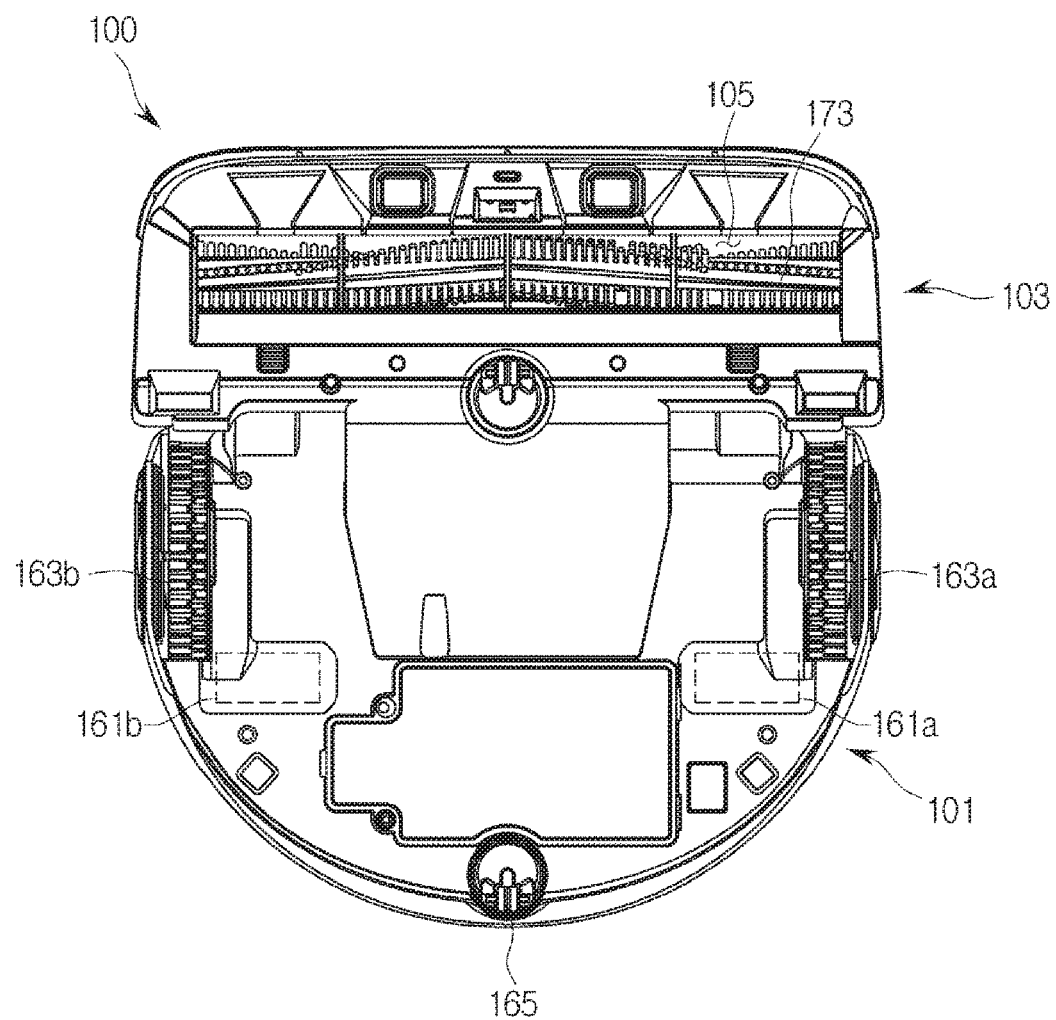
FIG. 5 is a bottom view of the cleaning robot.
Figure 6:
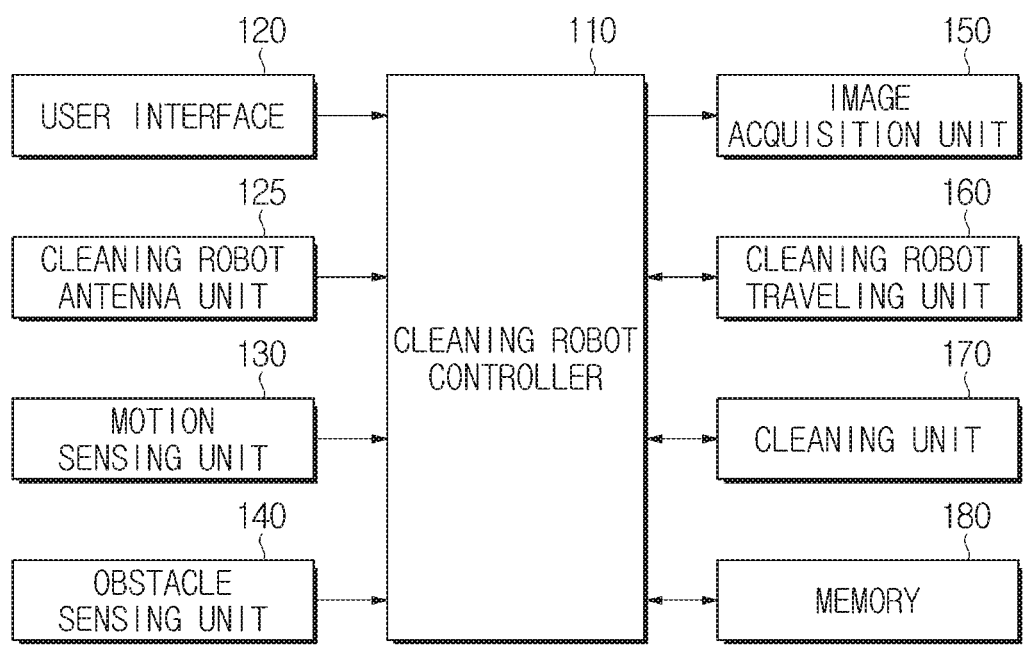
FIG. 6 is a control block diagram of the cleaning robot.

FIG. 3 is a view illustrating an outer appearance of a cleaning robot 100 according to an embodiment. FIG. 4 is a view illustrating the inside of the cleaning robot 100. FIG. 5 is a bottom view of the cleaning robot 100. FIG. 6 is a control block diagram of the cleaning robot 100.

Referring to FIGS. 3 to 6, the cleaning robot 100 according to an embodiment may include a main body 101 and a sub body 103. As illustrated in FIG. 3, the main body 101 may have a semicircular shape and the sub body 103 may have a rectangular shape.

However, the shape of the cleaning robot 100 is not limited to the structure including the main body 101 and the sub body 103. The cleaning robot 100 may be formed of a single body or include three or more bodies. In addition, the shapes of the main body 101 and the sub body 103 are designed for optimal cleaning and are not limited to the semicircular shape and the rectangular shape respectively. For example, the entire body of the cleaning robot 100 may be formed in a circular shape or a rectangular shape.

The main body 101 and the sub body 103 may be provided with a user interface 120 configured to interact with a user, an antenna unit 125 configured to receive an RF signal transmitted from the station 200, a motion sensing unit 130 configured to detect information on movement of the cleaning robot 100, an obstacle sensing unit 140 configured to sense an obstacle O located in a space to be cleaned, an image acquisition unit 150 configured to acquire images of surrounding areas of the cleaning robot 100, a moving unit 160 configured to move the cleaning robot 100, a cleaning unit 170 configured to clean the space to be cleaned, a memory 180 configured to store programs and data related to the operation of the cleaning robot 100, and a controller 110 configured to control the operation of the cleaning robot 100, inside and outside the main body 101 and the sub body 103.

Hereinafter, the antenna unit 125, the memory 180, and the controller 110 will be referred to as a cleaning robot antenna unit 125, a cleaning robot memory 180, and a cleaning robot controller 110, respectively to distinguish these elements from elements of the station 200 which will be described later.

However, the names of the elements included in the cleaning robot 100 are not limited to the user interface 120, the motion sensing unit 130, the obstacle sensing unit 140, the image acquisition unit 150, the moving unit 160, the cleaning unit 170, the cleaning robot memory 180, and the cleaning robot controller 110. The elements included in the cleaning robot 100 may also be referred to as different names performing the same functions.

As illustrated in FIG. 3, the user interface 120 may be disposed on the top surface of the main body 101 of the cleaning robot 100 and may include a plurality of input buttons 121 configured to receive control commands from the user and a display 123 configured to display information on the operation of the cleaning robot 100.

The plurality of input buttons 121 may include a power button 121a configured to turn on/off the cleaning robot 100, an operation button 121b configured to start or stop the operation of the cleaning robot 100, and a return button 121c configured to return the cleaning robot 100 to the station 200.

Each of the plurality of input buttons 121 may be a push switch or a membrane switch that senses a pressure applied by the user, a touch switch that senses a contact with a body part of the user, or the like.

The display 123 displays information on the cleaning robot 100 in response to a control command input by the user. For example, the display 123 may display an operation state of the cleaning robot 100, a power supply state, a cleaning mode selected by the user, a return to the station 200, and the like.

The display 123 may be implemented using a light emitting diode (LED), an organic light emitting diode (OLED), a liquid crystal display (LCD), or the like.

Also, the display 123 may also employ a touch screen panel (TSP) that receives a control command input by the user and displays information on the operation corresponding to the input control command.

The cleaning robot antenna unit 125 may receive an RF signal transmitted from the station 200. The station 200 may transmit the RF signal in all directions or in a predetermined direction. In general, the cleaning robot antenna unit 125 receives some of the RF signals transmitted from the station 200. Thus, hereinafter, an RF signal transmitted from the station 200 may be referred to as an RF guide signal and a signal received by the cleaning robot antenna unit 125 may be referred to as an RF signal for descriptive convenience.

The cleaning robot antenna unit 125 may receive the RF guide signal transmitted from the station 200 and provide a value of the received RF signal to a process of estimating a direction of the station 200 performed by the cleaning robot controller 110.

The cleaning robot antenna unit 125 may include a high power antenna. The high power antenna may include a directional antenna that measures intensities of received RF signals as different levels with respect to directions of receiving the RF signals. The cleaning robot 100 according to the present embodiment includes a directional antenna as an element of the cleaning robot antenna unit 125 to collect received signal strength indicator (RSSI) values with respect to angles, and this will be described later in more detail in the related part.

Types of the directional antenna may include microstrip antennas, dipole antennas, monopole antennas, patch antennas, chip antennas, yagi antennas, and the like. The directional antenna may include a shield such as a metal can or an RF shielding cloth that shields RF signals except for a directional angle. Meanwhile, even when the antenna is an omnidirectional antenna, directivity or directing performance may be improved by shielding angles other than a directional angle by using an external shield.

The cleaning robot antenna unit 125 may be arranged in the cleaning robot 100 in various ways. Hereinafter, various methods of arranging the cleaning robot antenna unit 125 in the cleaning robot 100 will be described in detail.

Figure 7:
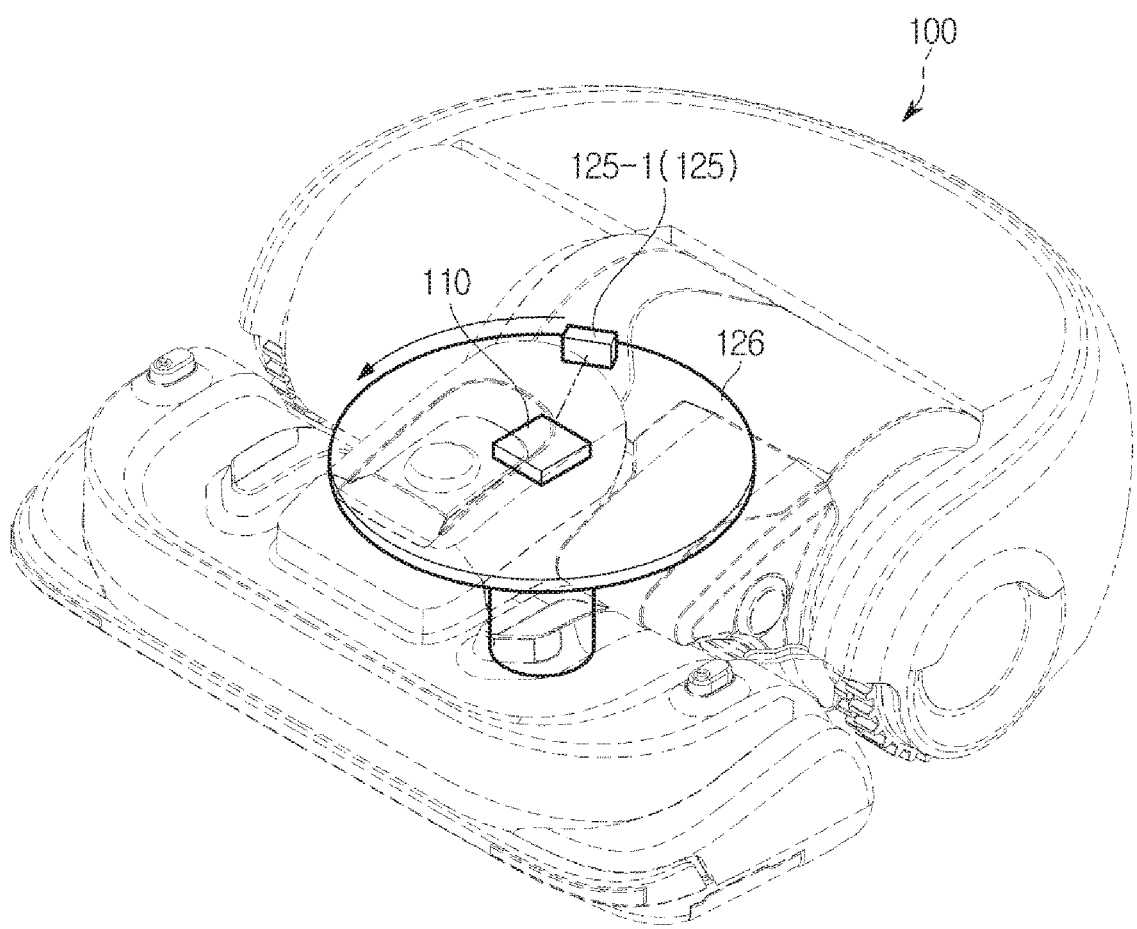
FIG. 7 is a view illustrating an exemplary method of arranging the cleaning robot antenna unit in the cleaning robot.
Figure 8:
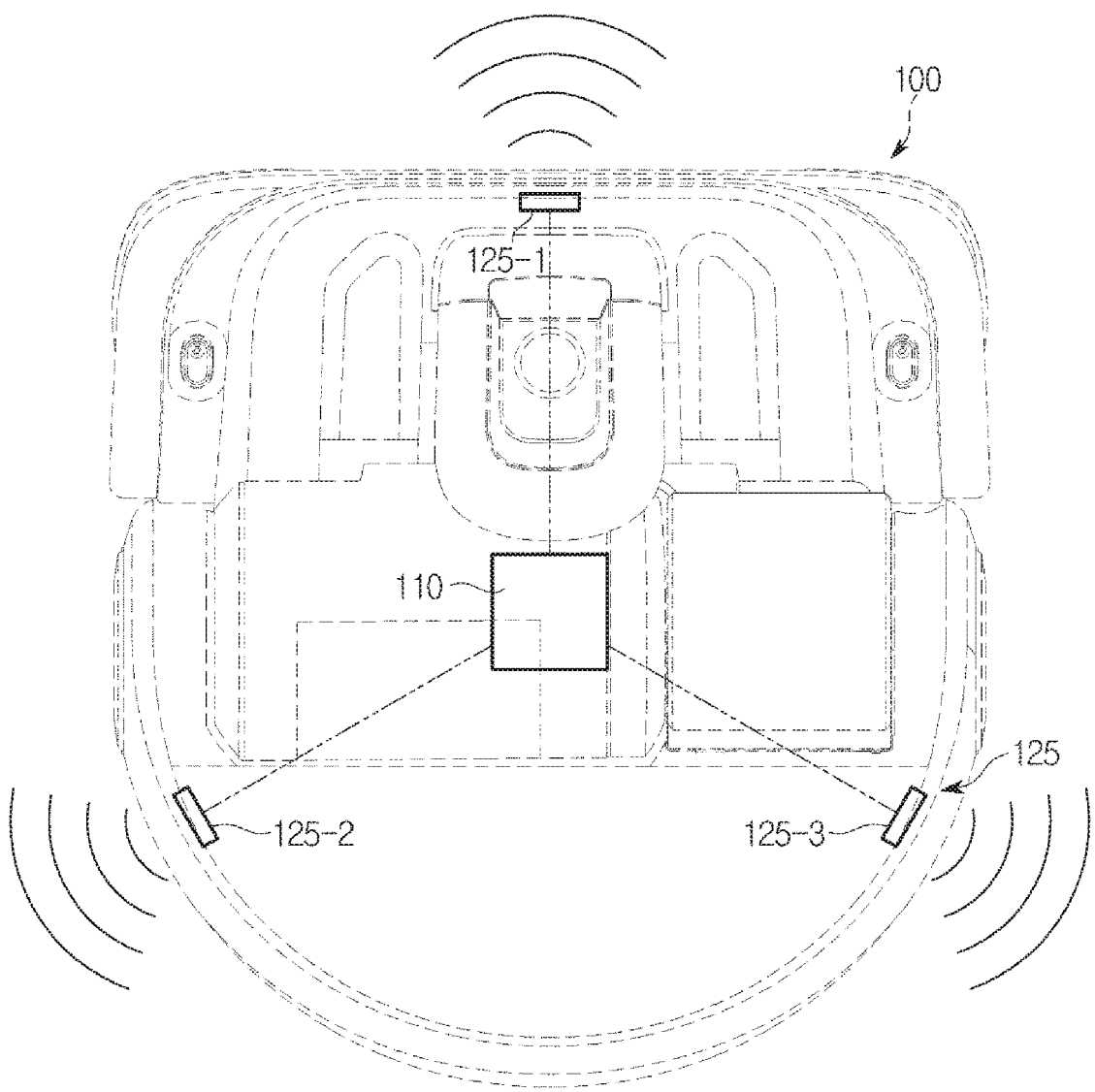
FIG. 8 is a view illustrating another exemplary method of arranging the cleaning robot antenna unit in the cleaning robot.
Figure 9:
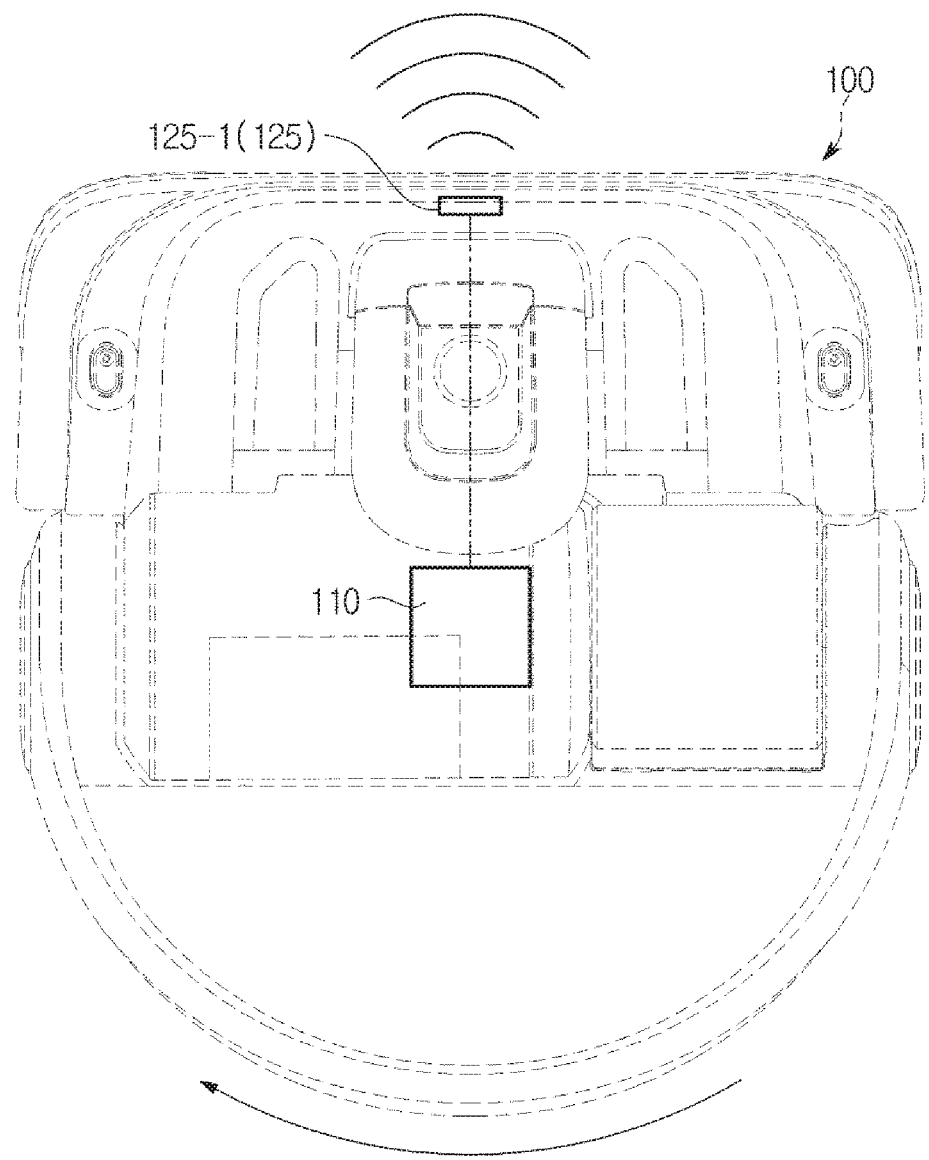
FIG. 9 is a view illustrating another exemplary method of arranging the cleaning robot antenna unit in the cleaning robot.

FIG. 7 is a view illustrating an exemplary method of arranging the cleaning robot antenna unit 125 in the cleaning robot 100. FIG. 8 is a view illustrating another exemplary method of arranging the cleaning robot antenna unit 125 in the cleaning robot 100. FIG. 9 is a view illustrating another exemplary method of arranging the cleaning robot antenna unit 125 in the cleaning robot 100.

FIG. 7 illustrates that a single antenna 25-1 disposed on a rotatable support plate 126 receives RF signals.

Referring to FIG. 7, the cleaning robot 100 further includes the rotatably provided support plate 126, and the cleaning robot antenna unit 125 is fixed to the support plate 126 and rotates together with the support plate 126.

The support plate 126 may rotate 360 degrees. Particularly, a rotary motor to rotate the support plate 126 and a sensor for constant speed rotation (e.g., hall sensor and photo interrupter) may be installed on the bottom surface of the support plate 126. However, types of the motor are not limited thereto and any other types of motor such as an encoder motor may also be used.

The cleaning robot antenna unit 125 that is fixed to the support plate 126 may scan the surroundings while rotating 360 degrees together with the support plate 126. While scanning the surroundings, the cleaning robot antenna unit 125 may receive an RF signal and transmit a value of the received RF signal to the cleaning robot controller 110. The cleaning robot controller 110 may estimate the direction of the station 200 by processing the RF signal received from the cleaning robot antenna unit 125. This will be described later in more detail in the related part.

According to the aforementioned method, it is possible to design a sensor capable of sensing all directions with high resolution by using only one directional antenna. In addition, since the support plate 126 rotates 360 degrees, a slip ring or a wireless power transmission method may be employed and wireless communication methods such as optical communication, Bluetooth, Wi-Fi, Bluetooth low energy (BLE), Zigbee, Near Field Communication (NFC), and ultra wideband (UWB) may be employed to supply power to the cleaning robot antenna unit 125 and to perform communicates.

FIG. 8 illustrates a method of receiving RF signals by a plurality of antennas 125-1, 125-2, and 125-3.

Referring to FIG. 8, a cleaning robot antenna unit 125 according to another embodiment may include plurality of antennas 125-1, 125-2, and 125-3. Although FIG. 8 exemplarily illustrates that one antenna 125-1 is installed at the front surface of the cleaning robot 100 and two antennas 125-2 and 125-3 are installed on opposite sides of the rear surface of the cleaning robot 100, installation examples of antennas are not limited thereto. For example, two cleaning robot antennas may also be installed on opposite sides of the cleaning robot 100 or at front and rear portions thereof. Alternatively, four or more antennas may be installed along edges of the cleaning robot 100. The cleaning robot antenna unit 125 may be configured such that a plurality of antennas is installed at the same angular interval. As the number of antennas increases, the direction of the tub 20 may be estimated more accurately.

The cleaning robot 100 according to the present embodiment may simultaneously receive RF signals via the plurality of antennas 125-1, 125-2, and 125-3. Or, a plurality of antennas may receive RF signal periodically by employing an antenna switching method. In the case where the antenna switching method is used, RF signal values received respectively from the antennas may be transmitted to the cleaning robot controller 110 by sequentially switching the antennas.

FIG. 9 illustrates a method of receiving RF signals performed by a single antenna 125-1.

Referring to FIG. 9, the cleaning robot antenna unit 125 may include a single antenna 125-1. While the antenna of the cleaning robot 100 exemplarily illustrated in FIG. 7 rotates by rotating the support plate 126, the antenna of the cleaning robot 100 according to the present embodiment rotates by rotating the cleaning robot 100 in place to receive RF signals and the received RF signals are transmitted to the cleaning robot controller 110.

Various installation methods of the cleaning robot antenna unit 125 have been described above. However, installation methods of the cleaning robot antenna unit 125 are not limited thereto and may include modifications obvious to those skilled in the art.

The motion sensing unit 130 senses movement of the cleaning robot 100 while the cleaning robot 100 is moving in a space to be cleaned.

The motion sensing unit 130 may measure acceleration, moving speed, moving displacement, and moving direction of the cleaning robot 100 while the cleaning robot 100 moves linearly. Also, the motion sensing unit 130 may measure rotational speed, rotational displacement, rotational radius, or the like of the cleaning robot 100 while the cleaning robot 100 make turns.

The motion sensing unit 130 may include an acceleration sensor and a gyro sensor to sense the movement of the cleaning robot 100 and an encoder and a hall sensor to sense rotation of driving wheels which will be described later.

The acceleration sensor may detect linear movement. For example, acceleration sensor may measure linear acceleration, linear velocity, and linear displacement of the cleaning robot 100 by using Newton's second law of motion.

The acceleration sensor may employ a Micro Electro Mechanical System (MEMS) type sensor manufactured in small size by merging micromechatronics, microelectronics, and semiconductor processing technologies, The gyro sensor called a gyroscope or an angular velocity sensor may detect rotational movement of the cleaning robot 100. Particularly, the gyro sensor may measure rotational angular velocity and rotational displacement by using conservation of angular momentum, Sagnac effect, and Coriolis force, and the like.

The gyro sensor may also employ an MEMS type sensor. For example, among MEMS type gyro sensors, a capacitive gyro sensor detects deformation of a micro-mechanical structure caused by a Coriolis force proportional to a rotational speed using a capacitance change and calculates a rotational speed from the capacitance change.

The encoder may include a light emitting device configured to emit light, a light receiving device configured to receive light, and a rotating slit and a fixed slit disposed between the light emitting device and the light receiving device. In this regard, the rotating slit may be provided to rotate with wheels and the fixed slit may be fixed to the main body 101.

Light emitted from the light emitting device may arrive at the light receiving device via the rotating slit or blocked by the rotating slit in accordance with rotation of the rotating slit. As a result, the light receiving device may output an electric signal in accordance with light received depending on rotation of the rotating slit.

In addition, the cleaning robot controller 110, which will be described below, may calculate a rotational speed and a rotational displacement of wheels based on the electric signal output from the light receiving device and calculate a linear movement speed, a linear displacement, a rotational movement speed, a rotational displacement, and the like based on the rotational speed and the rotational displacement of the wheels.

The hall sensor module may include a permanent magnet configured to generate a magnetic field and a hall sensor configured to detect the magnetic field. In this case, the permanent magnet may rotate with the wheels and the hall sensor may be fixed to the main body 101.

The hall sensor may or may not detect the magnetic field generated by the permanent magnet in accordance with rotation of the permanent magnet. As a result, the hall sensor may output an electric signal corresponding to the magnetic field detected according to rotation of the permanent magnet.

Also, the cleaning robot controller 110 described below may calculate the rotational speed and the rotational displacement based on the electric signal output from the hall sensor and calculate the linear movement speed, the linear displacement, the rotational movement speed, the rotational displacement, and the like based on the rotational speed and the rotational displacement of the wheels.

The obstacle sensing unit 140 may collect information on an obstacle O that hinders movement of the cleaning robot 100 and transmit the information to the cleaning robot controller 110.

In this case, the obstacle O refers to any object protruding from or recessed into the floor of the space to be cleaned so as to hinder the movement of the cleaning robot 100. The obstacle O may include furniture such as a table or sofa, a wall partitioning the space to be cleaned, or an entrance lower than the floor of the space to be cleaned.

The obstacle sensing unit 140 may include a light emitting unit configured to emit light and a light receiving unit configured to receive light reflected by the obstacle O in a predetermined direction among light emitted from the light emitting unit and reflected by the obstacle O. One or more light emitting units may be provided and one or more light receiving units may be provided according to embodiments.

The obstacle sensing unit 140 may be omitted if required. However, since the docking system according to the present embodiment is based on RF signals, it is preferably to use the obstacle sensing unit 140 to accurately align the cleaning robot 100 at the station 200 and to avoid the obstacle O in a short distance.

The image acquisition unit 150 may include an upper camera module configured to acquire an image above the cleaning robot 100, i.e., an image of the ceiling, and a front camera module configured to acquire an image ahead in the moving direction of the cleaning robot 100.

The upper camera module may include an image sensor (not shown) disposed at the top surface of the cleaning robot 100 and configured to acquire an image of an upper portion of the cleaning robot 100, i.e., a ceiling area of the space to be cleaned.

The front camera module may include an image sensor disposed at a front portion of the cleaning robot 100 and configured to align an image ahead in the moving direction of the cleaning robot 100.

The image sensors respectively included in the upper camera module and the front camera module may be implemented using a complementary metal oxide semiconductor (CMOS) sensor or a charge coupled device (CCD) sensor.

The image acquisition unit 150 may output the images acquired by the upper camera module and the front camera module to the cleaning robot controller 110, and the cleaning robot controller 110 may ascertain a position of the cleaning robot 100 based on the images acquired by the upper camera module and the front camera module. Specifically, the cleaning robot controller 110 may extract feature points from the images acquired by the upper camera module and the front camera module and determine the position of the cleaning robot 100 using the moving distance, the moving direction, the moving speed, and the like of the cleaning robot 100 based on changes in the positions of the extracted feature points.

The moving unit 160 moves the cleaning robot 100 and may include wheel drive motors 161*a* and 161*b*, wheels 163*a* and 163*b*, and a caster wheel 165 as illustrated in FIGS. 4 and 5.

The wheels 163*a* and 163*b* may be disposed at opposite ends of the bottom surface of the main body 101 and may include a left wheel 163*a* disposed at a left portion of the cleaning robot 100 and a right wheel 163*b* disposed at a right portion of the cleaning robot 100 with respect to the forward direction of the cleaning robot 100.

Also, the wheels 163*a*, and 163*b* may move the cleaning robot 100 upon receiving a rotational force from the wheel drive motors 161*a* and 161*b*.

The wheel drive motors 161*a* and 161*b* generate a rotational force to rotate the wheels and may include a left drive motor 161*a* to rotate the left wheel 163*a* and a right drive motor 161*b* to rotate the right drive motor 161*b*.

The left drive motor 161a and the right drive motor 161b may independently operate by receiving driving control signals respectively from the cleaning robot controller 110.

The left wheel 163a and the right wheel 163b may each independently rotate by the left drive motor 161a and the right drive motor 161b independently operating as described above.

In addition, since the left wheel 163a and the right wheel 163b independently rotate, the cleaning robot 100 may move in various ways, for example, move forward, move backward, move along a curved path, and perform 360° turns in place.

For example, when both of the left and right wheels 163a and 163b rotate in a first direction, the cleaning robot 100 may linearly move forward. When both of the left and right wheels 163a and 163b rotate in a second direction, the cleaning robot 100 may linearly move backward.

Also, when the left and right wheels 163a and 163b rotate in the same direction at different speeds, the cleaning robot 100 may perform a 360° turn in place in a clockwise or counterclockwise direction.

The caster wheel 165 is installed at the bottom surface of the main body 101 and assists the cleaning robot 100 to move in a stable state without interrupting movement of the cleaning robot 100.

In addition, the moving unit 160 may further include a motor driving circuit configured to supply a driving current to the wheel drive motor in accordance with a control signal of the cleaning robot controller 110, a power transmission module configured to transmit the rotational force of the wheel drive motor to the wheels, a rotation detection sensor configured to detect rotational displacements and rotational speeds of the wheel drive motor or wheels.

The cleaning unit 170 may include a drum brush 173 configured to scatter dusts on the floor of the space to be cleaned, a brush drive motor 171 configured to rotate the drum brush 173, a dust suction fan 177 configured to suck the scattered dusts, a dust suction motor 175 configured to rotate the dust suction fan 177, and a dustbag 179 configured to store the sucked dusts.

The cleaning robot memory 180 may store control programs and control data used to control the cleaning robot 100 and application programs and application data used to perform various functions in accordance with a user's input.

For example, the cleaning robot memory 180 may store operation system (OS) programs to manage the configuration and resources (software and hardware) included in the cleaning robot 100, signal processing programs to process the RF signals received from the cleaning robot antenna unit 125, and programs used to extract RSSI values from the RF signals and estimate the direction of the station 200 and RF signal information received from the cleaning robot antenna unit 125, RSSI value information acquired by processing the RF signals, direction information of the station 200 acquired based on the RSSI value information, and the like related to the programs. Also, the cleaning robot memory 180 may store a RSSI fingerprint map in which RSSI intensities and directions are previously stored with respect to areas to be cleaned or a simultaneous localization and mapping (SLAM) map according to embodiments.

Meanwhile, in case of the cleaning robot 100 of FIG. 7 in which the antenna 125-1 of the cleaning robot antenna unit 125 is fixed to the support plate 126, the cleaning robot memory 180 may store motor control programs configured to control a motor that rotates the support plate 126. In addition, in case of the cleaning robot 100 of FIG. 8 in which the cleaning robot antenna unit 125 includes a plurality of antennas 125-1, 125-2, and 125-3, the cleaning robot memory 180 may store programs used to process RF signals received by the plurality of antennas 125-1, 125-2, and 125-3 and control programs used to sequentially drive the plurality of antennas 125-1, 125-2, and 125-3. Also, in case of the cleaning robot 100 of FIG. 9, in which the cleaning robot antenna unit 125 includes the single antenna 125-1 and the RF signal is received via a 360° turn in place of the cleaning robot 100, the cleaning robot memory 180 may store control programs configured to control rotation of the cleaning robot 100.

Types of the cleaning robot memory 180 may include not only a volatile memory such as S-RAM and D-RAM but also a nonvolatile memory such as flash memory, Read Only Memory (ROM)), Erasable Programmable Read Only Memory (EPROM), and Electrically Erasable Programmable Read Only Memory (EEPROM). However, the types of the cleaning robot memory 180 are not limited thereto.

The cleaning robot controller 110 controls the overall operation of the cleaning robot 100 and a flow of signals among internal components of the cleaning robot 100 and processes data.

When a command is input from the user or preset conditions are satisfied, the cleaning robot controller 110 may execute the programs or applications stored in the cleaning robot memory 180.

The cleaning robot controller 110 may include a processor, a ROM in which control programs or applications to control the cleaning robot 100 are stored, and a RAM to store signals or data input from the outside of the cleaning robot 100 or used as a storage corresponding to various operations performed by the cleaning robot 100. Hereinafter, the ROM and RAM of the cleaning robot controller 110 may be concepts including ROM and RAM of the cleaning robot memory 180.

When a docking command is input from the user, the cleaning robot controller 110 may perform a process of estimating the direction of the station 200 to dock the cleaning robot 100 to the station 200. The process of estimating the direction of the station 200 performed by the cleaning robot controller 110 may include estimating the direction of the station 200 based on the RF signals received by the cleaning robot antenna unit 125 and information stored in the cleaning robot memory 180.

More particularly, the cleaning robot controller 110 may include a connection port through which the RF signal received by the cleaning robot antenna unit 125 is transmitted, a frequency filter configured to filter only a main communication frequency from the received RF signal, an amplifier configured to amplify the RF signal received by the cleaning robot antenna unit 125, an RSSI value extracting unit configured to extract an RSSI value from the filtered RF signal, a signal processor configured to estimate a direction of the station 200 by sensing the extracted RSSI value and extracting data included in the RF signal, and a communication unit configured to convert the extracted data into a communication signal and transmit the communication signal to a control device of the cleaning robot 100. The cleaning robot controller 110 may be configured using a circuit and may also have a structure including an integrated circuit (IC) exclusively for RF communications.

Examples of the method of estimating the direction of the station 200 performed by the cleaning robot controller 110 may include a Received Signal Strength Indicator (RSSI) method and an RSSI fingerprint map method.

The RSSI method is a method of estimating the direction of the station 200 based on characteristics of the RSSI values in various directions without using the RSSI fingerprint map and the RSSI fingerprint map method is a method of estimating the direction of the station 200 by using a pre-stored RSSI fingerprint map.

Figure 10:
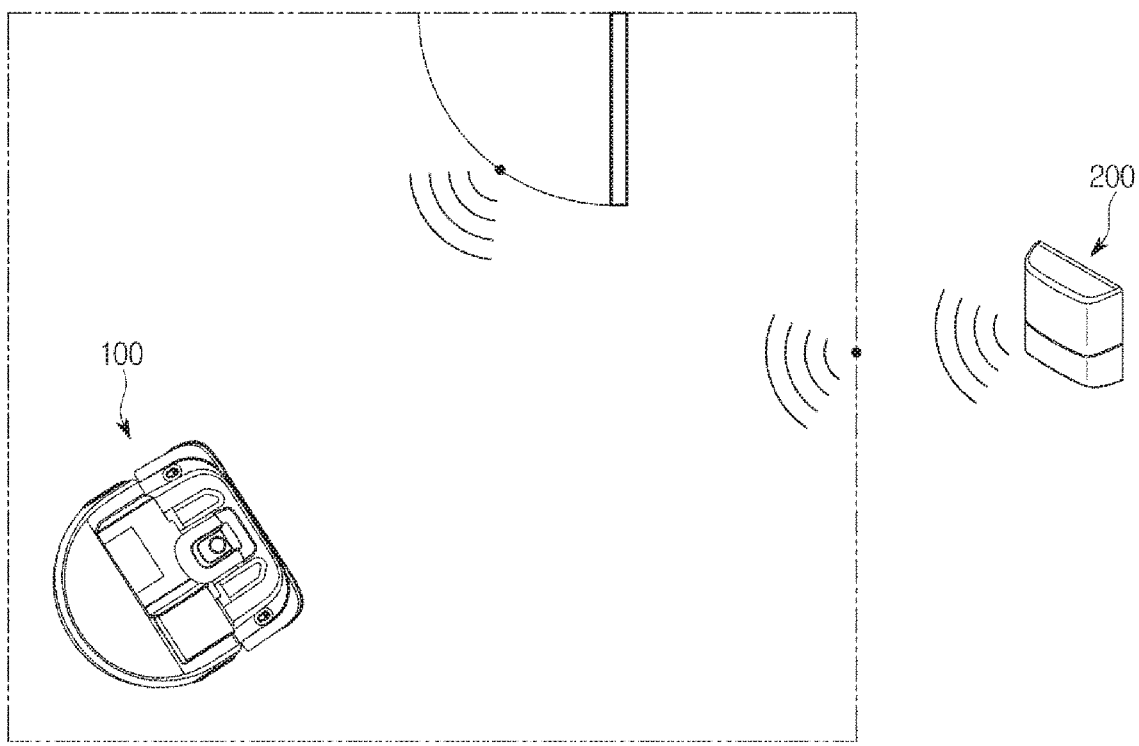
FIG. 10 is a conceptual diagram illustrating an RSSI method.
Figure 11:
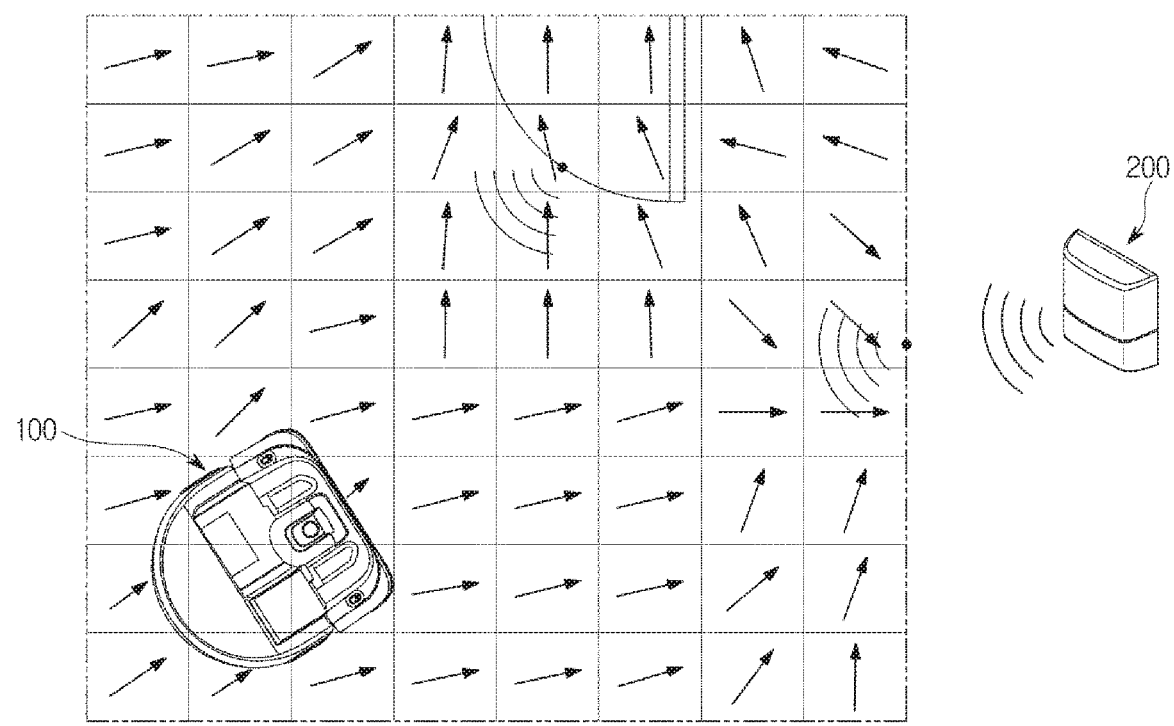
FIG. 11 is a conceptual diagram illustrating an RSSI fingerprint map method.

FIG. 10 is a conceptual diagram illustrating an RSSI method. FIG. 11 is a conceptual diagram illustrating an RSSI fingerprint map method.

Referring to FIG. 10, the RSSI method is a method of extracting RSSI values from the RF signals received in various directions with respect to the cleaning robot 100 and estimating the direction of the station 200 based on the extracted RSSI values.

In case of the cleaning robots 100 illustrated in FIGS. 7 and 9, the cleaning robot controller 110 may control the movement of the cleaning robot 100 by estimating a direction where a highest RSSI value is obtained among the extracted RSSI values as the direction of the station 200. When an obstacle O is located in the moving direction of the cleaning robot 100, the cleaning robot controller 110 may control the movement of the cleaning robot 100 by estimating a direction when a second highest RSSI value is obtained at the same position as the direction of the station 200.

As described above, the RF signal may have properties of penetration, diffraction, and reflection depending on properties of itself. Due to these properties of the RF signal, the cleaning robot 100 may estimate a direction where the strongest RF signal is received, i.e., in a direction where the highest RSSI value is extracted, as the direction of the station 200 even when the station 200 is not located in the sight of the cleaning robot 100.

Meanwhile, in case of the cleaning robot 100 illustrated in FIG. 8, the cleaning robot controller 110 may extract RSSI values by processing the RF signals received from the plurality of antennas 125-1, 125-2, and 125-3, extract a new RSSI value by integrating the extracted RSSI values, and control the cleaning robot 100 to dock to the station 200 based on the extracted new RSSI value.

Next, referring to FIG. 11, the method of using the RSSI fingerprint map is a method of adding a pre-stored RSSI fingerprint map to the above-described RSSI method.

That is, the RSSI fingerprint map method has improved accuracy of a process of estimating the direction of the station 200 by storing not only RSSI intensity values but also RSSI direction values in a cell map of the fingerprint method in which characteristics are stored on the basis of position. The RSSI direction values are stored in the RSSI fingerprint map as a concept of probability. For example, a first direction with respect to a given cell may be set as a priority direction and a second direction and a third direction may be stored in a descending order of priority. Although priority directions of the cells are indicated as arrows in FIG. 11 for descriptive convenience, the RSSI direction values respectively stored in the cells are not limited the illustrated direction values.

With the expanding environment of the Internet of Things in recent years, occurrence of errors caused by various interference signals may increase during a process of extracting the direction of the station 200 performed by the cleaning robot 100. However, the cleaning robot 100 according to the present embodiment may prepare for the aforementioned errors by previously preparing an RSSI fingerprint map and providing the prepared RSSI fingerprint map in a process of estimating the direction of the station 200 during the docking process of the cleaning robot 100. Since the RSSI fingerprint map stores the direction of the station 200, unnecessary operation based on RSSI values extracted in real time by other interference signals may be minimized.

Meanwhile, the cleaning robot 100 according to the present embodiment may estimate the direction of the station 200 by linking the SLAM map with the RSSI fingerprint map. Specifically, when the cleaning robot 100 uses both the RSSI fingerprint map method and the SLAM map method, the existence of the obstacle O at a given position is previously determined, so that efficient route setting may be possible by classifying characteristics of the RF signals into transmitted waves, diffracted waves, or reflected waves.

The cleaning robot 100 of the cleaning robot docking system has been described above. Next, the station 200 of the cleaning robot docking system will be described.

Figure 12:
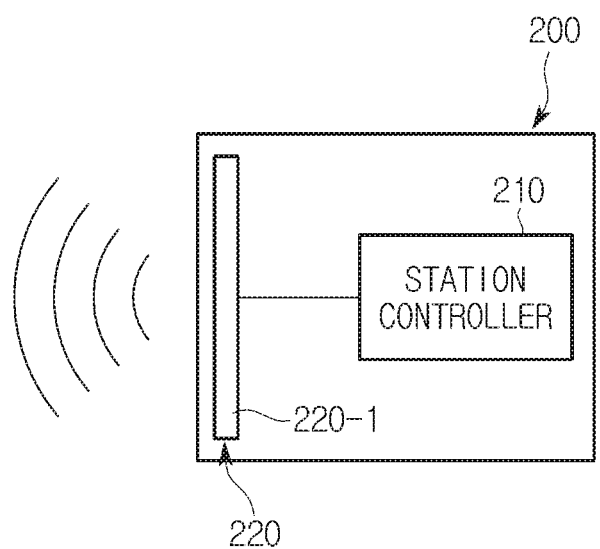
FIG. 12 is a conceptual diagram of a station according to an embodiment.
Figure 13:
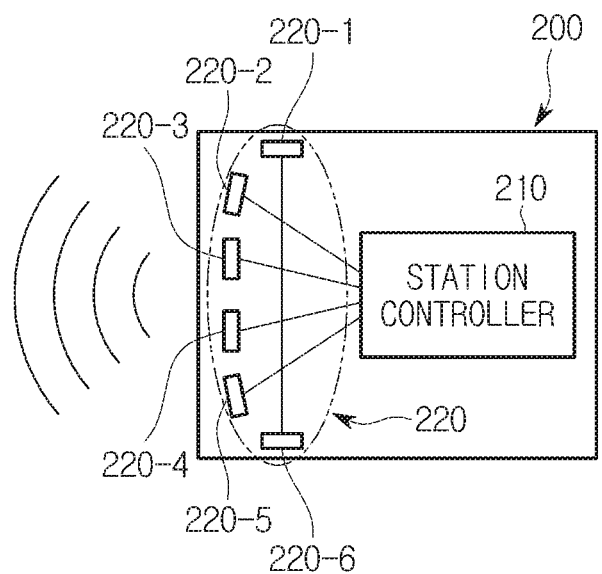
FIG. 13 is a conceptual diagram of a station according to another embodiment.
Figure 14:
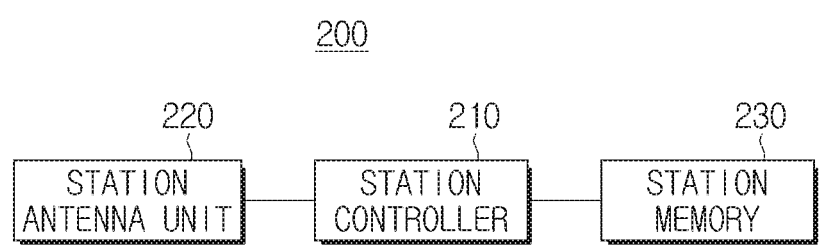
FIG. 14 is a control block diagram of the station according to an embodiment.

FIG. 12 is a conceptual diagram of a station 200 according to an embodiment. FIG. 13 is a conceptual diagram of a station 200 according to another embodiment. FIG. 14 is a control block diagram of the station 200 according to an embodiment.

The station 200 is a device equipped with a charging device to charge a battery built in the cleaning robot. Referring to FIGS. 12 to 14, the station 200 according to an embodiment may include a station antenna unit 220 configured to transmit an RF guide signal to guide the cleaning robot 100 to a docking position, a station memory 230 configured to store programs and data related to the operation of the station 200, and a station controller 210 configured to generate the RF guide signal transmitted from the station antenna unit 220.

The station antenna unit 220 and the station controller 210 have similar functions as the aforementioned cleaning robot antenna unit 125 and cleaning robot controller 110. That is, the station controller 210 may generate RF signals and the station antenna unit 220 may transmit the RF signals generated by the station controller 210.

The station antenna unit 220 may include a high power antenna as described above with reference to the cleaning robot antenna unit 125. The high power antenna may include a directional antenna that measures intensities of received RF signals as different levels with respect to directions of receiving the RF signals.

Types of the directional antenna may include microstrip antennas, dipole antennas, monopole antennas, patch antennas, chip antennas, yagi antennas, and the like. The directional antenna may include a shield such as a metal can or an RF shielding cloth that shields RF signals except for a directional angle. Meanwhile, even when the antenna is an omnidirectional, directivity or directing performance may be improved by shielding angles other than a directional angle by using an external shield.

The station antenna unit 220 may be arranged on the front surface of the station in various ways. For example, the station antenna unit 220 may include a single antenna 220-1 as illustrated in FIG. 12 or a plurality of antennas 220-1, 220-2, 220-3, 220-4, 220-5, and 220-6 as illustrated in FIG. 13.

More particularly, when the station antenna unit 220 is implemented using a single antenna 220-1, the single antenna 220-1 may be arranged to have a front directional angle of 180 degrees. Meanwhile, when the station antenna unit 220 includes the plurality of antennas 220-1, 220-2, 220-3, 220-4, 220-5, and 220-6, the plurality of antennas 220-1, 220-2, 220-3, 220-4, 220-5, and 220-6 may be arranged such that a sum of front directional angles thereof is 180 degrees.

The plurality of antennas 220-1, 220-2, 220-3, 220-4, 220-5, and 220-6 may transmit the same RF guide signal simultaneously or different RF guide signals sequentially. This may be adjusted depending on a control process of the cleaning robot 100 and will be described in more detail below with reference to the station controller 210.

The station memory 230 may store control programs and control data used to control the station 200 and application programs and application data used to perform various functions in accordance with a user's input.

For example, the station memory 230 may store programs to generate the RF guide signal in the station 200 or programs to transmit the generated RF guide signal or to determine a station antenna through which the RF guide signal is transmitted. Also, the station memory 230 may store RSSI value information received from the cleaning robot 100 together with information on feature points of the station antenna.

Types of the station memory 230 may include not only a volatile memory such as S-RAM and D-RAM but also a nonvolatile memory such as flash memory, Read Only Memory (ROM)), Erasable Programmable Read Only Memory (EPROM), and Electrically Erasable Programmable Read Only Memory (EEPROM). However, the types of the station memory 230 are not limited thereto.

The station controller 210 controls the overall operation of the station 200 and a flow of signals among internal components of the station 200 and processes data.

When a command is input from the user or preset conditions are satisfied, the station controller 210 may execute the programs or applications store in the station memory 230.

The station controller 210 may include a processor, a ROM in which control programs or applications to control the station 200 are stored, and a RAM to store signals or data input from the outside of the station 200 or used as a storage corresponding to various operations performed by the cleaning robot 100. Hereinafter, the ROM and RAM of the station controller 210 may be concepts including ROM and RAM of the station memory 230.

The station controller 210 may generate the RF guide signal and control the station antenna unit 220 to transmit the RF guide signal. Specifically, the station controller 210 may transmit the RF guide signal by combining the RF guide signal with information on feature points of the antenna and determine an angle between the station 200 and the cleaning robot 100 based on the information on feature points of the antenna outputting the highest RSSI value.

When the station antenna unit 220 includes a plurality of antennas, the station controller 210 may minimize interference of the RF guide signals respectively output from the station antennas by performing the following control operations.

The station controller 210 may select a station antenna outputting the highest RSSI value among the plurality of station antennas by performing a switching operation of the station antennas once and control the selected station antenna to transmit the RF guide signal. In this regard, the RSSI value refers to an RSSI value received from the cleaning robot 100.

Specifically, upon receiving an antenna selection loop request protocol from the cleaning robot 100, the station controller 210 switches a first station antenna 220-1 to an On state and transmit an RF guide signal with feature points of the first station antenna 220-1.

The cleaning robot 100 receives the RF guide signal from the first station antenna 220-1 and the cleaning robot controller 110 extracts an RSSI value by processing the received RF signal. In this regard, the RF guide signal received by the cleaning robot 100 includes information on the feature points of the first station antenna 220-1. Next, the cleaning robot 100 transmits the extracted RSSI value to the station 200 with the information on the feature points of the first station antenna 220-1.

Upon receiving a signal including the information on the feature points of the first station antenna 220-1 and the RSSI value from the cleaning robot 100, the station controller 210 switches the first station antenna 220-1 into an Off state and switches the second station antenna 220-2 into an On state and performs the same process as the first station antenna 220-1. The station controller 210 repeats the aforementioned process for the third to sixth station antennas 220-3, 220-4, 220-5, and 220-6, determines a station antenna having the highest RSSI value, and transmits a signal indicating completion of the antenna selection loop to the cleaning robot 100.

The station controller 210 may adjust the intensity of the RF guide signal output from the station antenna unit 220 based on the distance between the cleaning robot 100 and the station 200.

In general, as an output intensity of the station antenna unit 220 increases, a distance the RF guide signal traveling from the station antenna unit 220 increases. Due to this property, as the cleaning robot 100 approaches the station 200, a phenomenon in which RSSI values are saturated may occur around the station 200. In order to prevent this phenomenon, a technique of varying output power of the station antenna in accordance with distance between the cleaning robot 100 and the station 200 may be applied thereto.

For example, as the distance between the cleaning robot 100 and the station 200 decreases, the station controller 210 may decrease the intensity of the RF guide signal transmitted from the station antenna. The distance between the cleaning robot 100 and the station 200 may be calculated based on information collected by the obstacle sensing unit 140 of the cleaning robot 100. Hereinafter, detailed descriptions on what are well known in the art will be omitted.

The cleaning robot 100 and the station 200 have been described in detail. Next, a method of controlling the cleaning robot 100 will be described in detail. For better understanding thereof, processes of controlling the cleaning robot 100 will be described by using the aforementioned RSSI method and RSSI fingerprint map method respectively.

Figure 15:
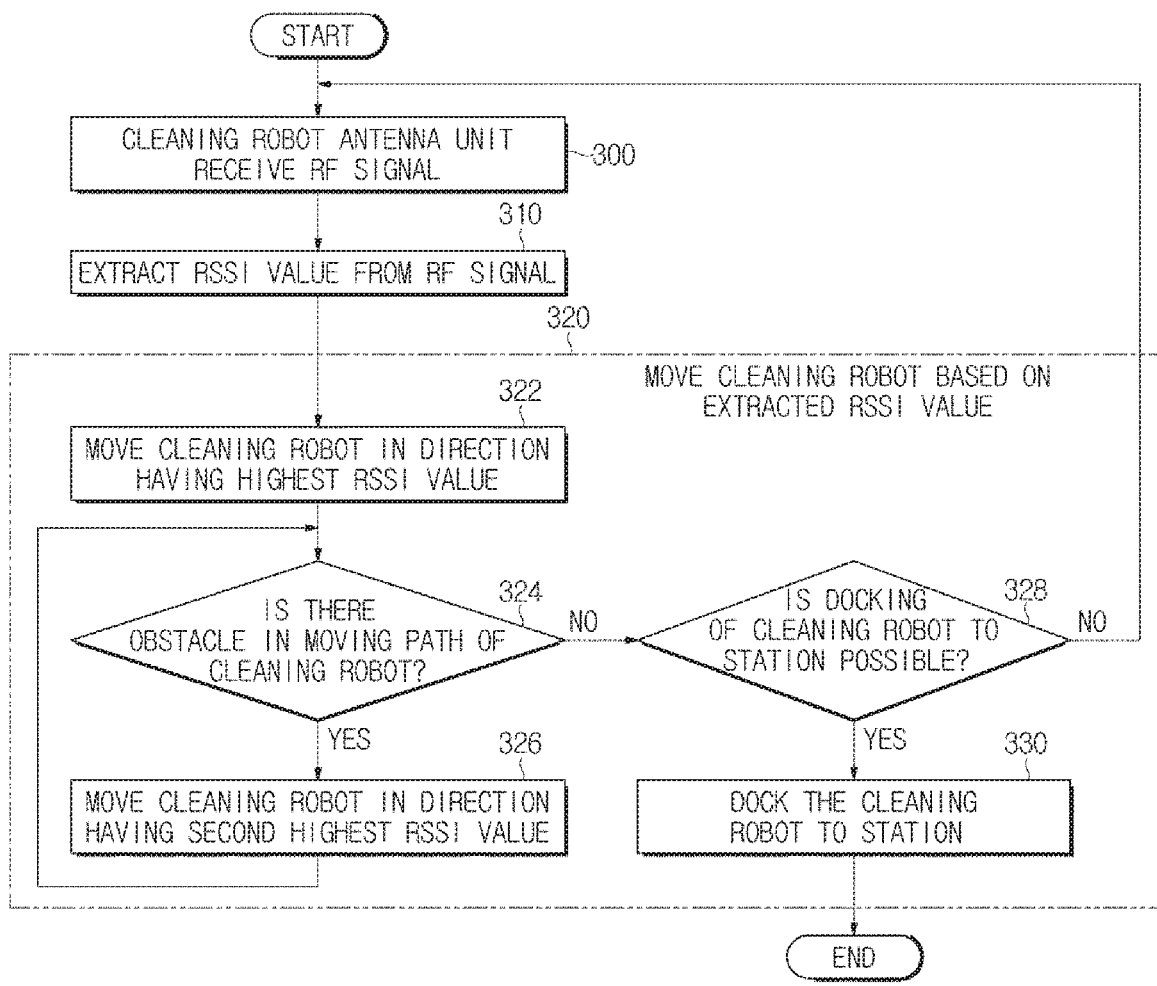
FIG. 15 is a flowchart for describing a process of controlling the cleaning robot in accordance with the RSSI method.
Figure 16:
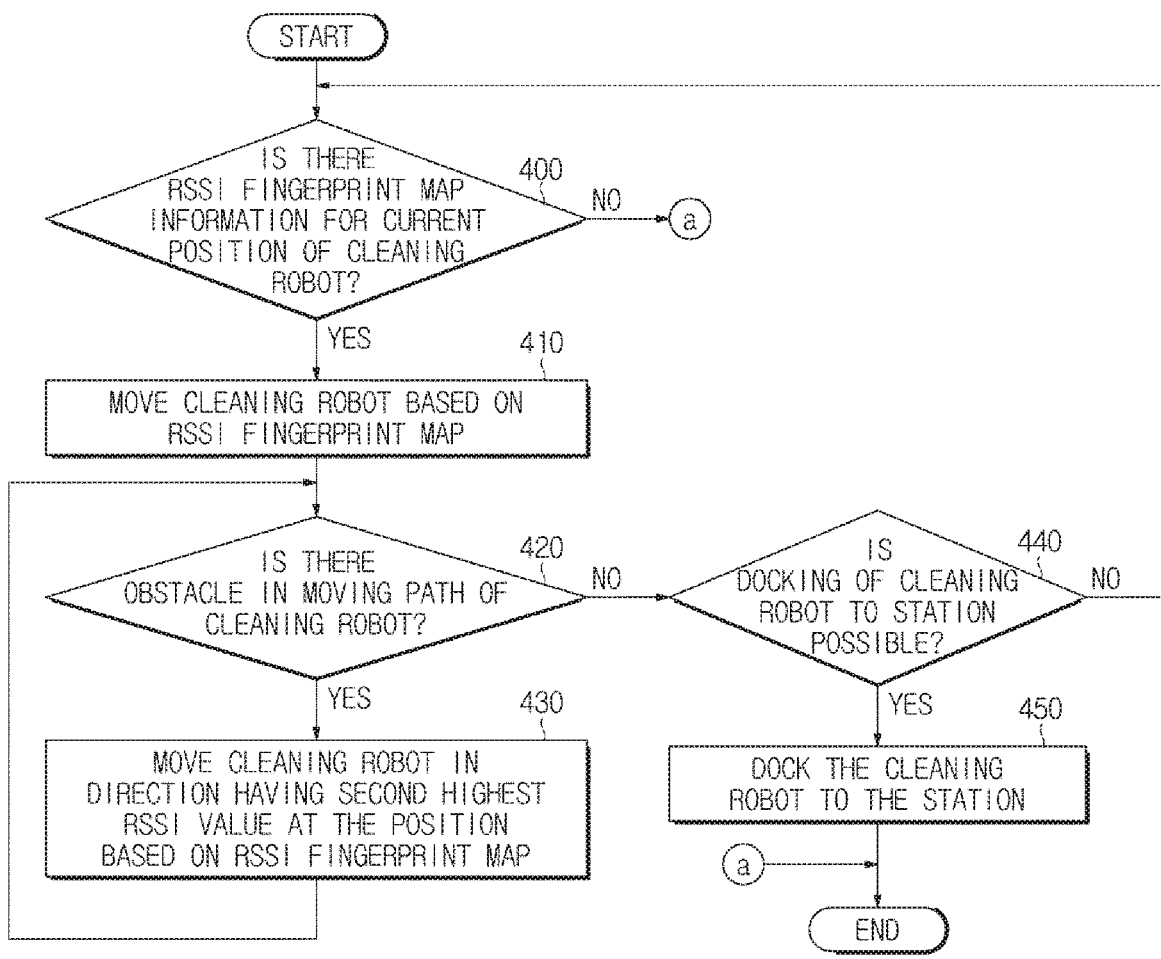
FIG. 16 is a flowchart for describing a process of controlling the cleaning robot in accordance with the RSSI fingerprint map method.

FIG. 15 is a flowchart for describing a process of controlling the cleaning robot 100 in accordance with the RSSI method. FIG. 16 is a flowchart for describing a process of controlling the cleaning robot 100 in accordance with the RSSI fingerprint map method.

First, a method of docking the cleaning robot 100 according to the RSSI method will be described with reference to FIG. 15. Referring to FIG. 15, the process of controlling the cleaning robot 100 according to the present embodiment includes receiving an RF signal transmitted from the station 200, the receiving being performed by the cleaning robot antenna unit 125 (300), extracting an RSSI value by processing the received RF signal (310), and moving the cleaning robot 100 based on the extracted RSSI value (320).

First, when a docking command is input by the user or the cleaning robot 100 needs to dock to the station 200 according to preset standards, a docking process of the cleaning robot 100 may be performed as follows.

When the docking process is initiated, the cleaning robot antenna unit 125 receives an RF signal transmitted from the station 200 (300). The station 200 may transmit a RF guide signal via a station antenna. The antenna of the cleaning robot may receive the RF signal from the station 200 and transmit the received RF signal to the cleaning robot controller 110.

Next, the received RF signal is processed to extract an RSSI value. The cleaning robot controller 110 may extract the RSSI value by processing the RF signal received from the cleaning robot antenna unit 125. As described above, the cleaning robot antenna may be rotatably provided in a state of being fixed to the support plate 126, and the cleaning robot controller 110 may extract the RSSI value of the RF signal with respect to rotation angle of the cleaning robot antenna (310).

Next, the cleaning robot 100 moves based on the extracted RSSI value (320).

In case of the cleaning robots 100 illustrated in FIGS. 7 and 9, the cleaning robot 100 may estimate a direction where a highest RSSI value is extracted among the extracted RSSI values as a direction of the station 200 and move in the estimated direction (322). For example, when an RSSI value in a first direction is determined as a maximum RSSI value, the cleaning robot 100 may move in the first direction (322).

When the obstacle O is located in a moving path of the cleaning robot 100 in the first direction, the cleaning robot controller 110 may estimate a direction where a second highest RSSI value is extracted at a position where the obstacle O is detected as a direction of the station 200 and control the cleaning robot 100 to move in the estimated direction. For example, if the RSSI value of a second direction is determined as the second highest RSSI value at the position where the obstacle O is detected, the cleaning robot 100 may move in the second direction (324 and 326).

If there is no obstacle O in the moving path of the cleaning robot 100 in the first direction, the cleaning robot controller 110 may control the cleaning robot moving unit 160 such that the cleaning robot 100 keeps moving in the first direction.

Meanwhile, in case of the cleaning robot 100 illustrated in FIG. 8, the cleaning robot 100 may extract RSSI values by processing RF signals received from the plurality of antennas 125-1, 125-2, and 125-3, extract a new RSSI value by integrating the extracted RSSI values, and control the movement of the cleaning robot 100 to dock to the station 200 based on the extracted new RSSI value.

In this case, the new RSSI value refers to a vector value in which RSSI vector values of various directions are integrated. In other words, if the directions of the RSSI values extracted from the cleaning robot antennas 125-1, 125-2 and 125-3 are a first direction, a second direction, and a third direction, respectively, a direction of the integrated RSSI values refers to a fourth direction as a sum of the first to third direction vectors.

When there is an obstacle O in a moving path of the cleaning robot 100 in the fourth direction, the cleaning robot controller 110 may estimate a direction where a second highest RSSI value is extracted at a position where the obstacle O is detected as the direction of the station 200 and control the cleaning robot moving unit 160 to move the cleaning robot 100 in the estimated direction. For example, if the directions of the RSSI values extracted from the cleaning robot antennas 125-1, 125-2 and 125-3 are a first direction, a second direction, and a third direction, respectively, a direction where the second highest RSSI value is extracted may refer to a fifth direction as a sum of the other direction vectors except for the highest first direction vector.

If there is no obstacle O in the moving path of the cleaning robot 100 in the fourth direction, the cleaning robot controller 110 may control the cleaning robot moving unit 160 such that the cleaning robot 100 keeps moving in the fourth direction.

While the cleaning robot 100 is moving in the first or fourth direction, the cleaning robot controller 110 determines whether docking of the cleaning robot 100 to the station 200 is possible based on the RF guide signal transmitted from the station 200 or the signal sensed by the obstacle sensing unit 140.

If docking of the cleaning robot 100 to the station 200 is possible, the cleaning robot 100 may dock to the station 200 (330).

Meanwhile, when the cleaning robot 100 is difficult to dock to the station 200, the cleaning robot controller 110 returns to processes of estimating the direction of the station 200 (300, 310, 322, 324, and 326) to perform the process of estimating the position of the station 200.

Next, a method of controlling the cleaning robot 100 according to the RSSI method will be described with reference to FIG. 16.

A docking process of the cleaning robot 100 according to the present embodiment is performed based on an RSSI fingerprint map stored in the cleaning robot memory 180. Referring to FIG. 16, if there is RSSI fingerprint map data for a current position of the cleaning robot 100, the docking process of the cleaning robot 100 is performed based on the map data. If there is no RSSI fingerprint map data, the docking process of the cleaning robot 100 may be performed according to the process described above with reference to FIG. 15.

More particularly, when a docking command is input by the user or the cleaning robot 100 needs to dock to the station 200 according to preset standards, a docking process of the cleaning robot 100 may be performed as follows.

When the docking process is initiated, a position of the cleaning robot 100 may be determined. The cleaning robot controller 110 may determine a current position of the cleaning robot 100 based on RSSI fingerprint map data or SLAM map information previously stored in the cleaning robot memory 180.

When the current position of the cleaning robot 100 is determined, the cleaning robot controller 110 determines whether there is RSSI fingerprint map data for the current position of the cleaning robot 100.

If there is no RSSI fingerprint map data for the current position based on the RSSI fingerprint map information received from the cleaning robot memory 180, the cleaning robot controller 110 perform a docking process described above with reference to FIG. 15 (operation a of FIG. 16).

If there is RSSI fingerprint map data for the current position, the cleaning robot controller 110 may estimate the direction of the station 200 based on the RSSI fingerprint map data.

An obstacle O is detected in a moving path of the cleaning robot 100, the cleaning robot controller 110 estimate a direction having a second highest RSSI value based on the RSSI fingerprint map information for the position where the obstacle O is detected as the direction of the station 200 and control the cleaning robot moving unit 160 to move the cleaning robot 100 in the estimated direction (420 and 430).

Meanwhile, if there is no obstacle O in the moving path of the cleaning robot 100, the cleaning robot controller 110 may control the cleaning robot moving unit 160 to allow the cleaning robot 100 to keep moving in the path (420).

When docking of the cleaning robot 100 is possible while the cleaning robot 100 is moving, the cleaning robot 100 may dock to the station (440 and 450).

Meanwhile, when the cleaning robot 100 is difficult to dock to the station 200, the cleaning robot controller 110 may return to the process of estimating the direction of the station 200 (400 to 430).

As is apparent from the above description, according to the cleaning robot and the method of controlling the same according to an embodiment, the following effects may be obtained due to properties of RF signals.

First, even when an obstacle is located between the cleaning robot and the station, the cleaning robot may estimate the direction of the station.

In addition, even when the cleaning robot is located at a remote position from the station, the cleaning robot may estimate the direction of the station.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A cleaning robot comprising:
a cleaning robot antenna configured to receive a radio frequency (RF) signal transmitted from a station;
a memory configured to store map data including information on intensity and direction of a received signal strength indicator (RSSI) value for an area to be cleaned; and
a controller configured to:
extract the RSSI value by processing the RF signal received by the cleaning robot antenna,
control movement of the cleaning robot to dock to the station based on the extracted RSSI value,
estimate a direction of the station based on map data when map data for a current position of the cleaning robot is stored in the memory, and
estimate the direction of the station based on the extracted RSSI value when map data for the current position of the cleaning robot is not stored in the memory.

2. The cleaning robot according to claim 1, wherein the controller is configured to control movement of the cleaning robot in the estimated direction.

3. The cleaning robot according to claim 1, wherein the cleaning robot antenna comprises a directional antenna configured to measure intensities of RF signals as different levels on a basis of direction of receiving the RF signal.

4. The cleaning robot according to claim 1, further comprising a rotatably provided support plate, wherein:
the cleaning robot antenna is fixed to the support plate and rotates together with the support plate, and
the controller is configured to:
extract RSSI values with respect to rotation angles of the support plate, and
control movement of the cleaning robot in a direction where a highest RSSI value is extracted based on the extracted RSSI values.

5. The cleaning robot according to claim 1, wherein the cleaning robot antenna comprises a plurality of antennas, and
the controller is configured to:
extract RSSI values by processing RF signals received by the plurality of antennas,
extract a new RSSI value by integrating the extracted RSSI values, and
control movement of the cleaning robot to dock to the station based on the extracted new RSSI value.

6. The cleaning robot according to claim 5, wherein the controller is configured to sequentially control On/Off states of the plurality of antennas.

7. The cleaning robot according to claim 1, wherein the controller is configured to:
control the cleaning robot to turn in place,
extract RSSI values with respect to rotation angles of the cleaning robot, and
control movement of the cleaning robot in a direction where a highest RSSI value is extracted based on the extracted RSSI values.

8. The cleaning robot according to claim 1, wherein the cleaning robot antenna is configured to receive the RF signal that is generated by a station controller of the station and transmitted from a station antenna of the station.

9. The cleaning robot according to claim 8, wherein the cleaning robot antenna is configured to receive the RF signal from a plurality of antennas of the station.

10. The cleaning robot according to claim 8, wherein the controller is configured to receive the RF signal at a decreased intensity as a distance between the cleaning robot and the station decreases based on the movement of the cleaning robot.

11. A method of controlling a cleaning robot, the method comprising:
receiving an RF signal transmitted from a station, the receiving being performed by a cleaning robot antenna;
extracting a received signal strength indicator (RSSI) value by processing the received RF signal; and
moving the cleaning robot to dock to the station based on the extracted RSSI value,
wherein the cleaning robot comprises a memory in which map data including information on intensity and direction of the RSSI value for an area to be cleaned is stored, and
wherein the moving of the cleaning robot to dock to the station based on the extracted RSSI value comprises:
estimating a direction of the station based on map data when map data for a current position of the cleaning robot is stored in the memory, and
estimating the direction of the station based on the extracted RSSI value when map data for the current position of the cleaning robot is not stored in the memory.

12. The method according to claim 11, wherein the moving of the cleaning robot to dock to the station based on the extracted RSSI value comprises moving the cleaning robot in the estimated direction.

13. The method according to claim 11, wherein the cleaning robot comprises a rotatably provided support plate to which the cleaning robot antenna is fixed, and
the receiving of the RF signal transmitted from the station comprises a process in which the cleaning robot antenna receives the RF signal transmitted from the station while rotating together with the support plate at a time.

14. The method according to claim 13, wherein the extracting of the RSSI value by processing the received RF signal comprises extracting an RSSI value with respect to a rotation angle of the support plate by processing the received RF signal.

15. The method according to claim 14, wherein the moving of the cleaning robot to dock to the station based on the extracted RSSI value comprises moving the cleaning robot in a direction where a highest RSSI value is extracted based on the extracted RSSI value.

16. The method according to claim 11, wherein the cleaning robot antenna comprises a plurality of antennas, and the extracting of the RSSI value by processing the received RF signal and the moving of the cleaning robot to dock to the station based on the extracted RSSI value comprises:

extracting RSSI values by processing RF signals received by the plurality of antennas, extracting a new RSSI value by integrating the extracted RSSI values, and moving the cleaning robot to dock to the station based on the extracted new RSSI value.

17. The method according to claim 11, wherein the receiving of the RF signal transmitted from the station comprises receiving an RF signal transmitted from the station via the cleaning robot antenna while the cleaning robot turns in place, and the moving of the cleaning robot to dock to the station based on the extracted RSSI value comprises:

estimating a direction where a highest RSSI value is extracted as a direction of the station based on the extracted RSSI value; and moving the cleaning robot in the estimated direction.

18. The method according to claim 11, wherein when an obstacle is detected in a moving path of the cleaning robot, the cleaning robot moves in a direction where a second highest RSSI value is extracted at a position where the obstacle is detected.

* * * * *